United States Patent
Hu et al.

(10) Patent No.: US 11,649,340 B1
(45) Date of Patent: May 16, 2023

(54) PHOSPHORUS-CONTAINING SILANE COMPOUND, METHOD OF MAKING THE SAME, RESIN COMPOSITION AND ARTICLE MADE THEREFROM

(71) Applicant: Elite Electronic Material (Zhongshan) Co., Ltd., Zhongshan (CN)

(72) Inventors: Zhilong Hu, Zhongshan (CN); Changyuan Li, Zhongshan (CN); Hongxia Peng, Zhongshan (CN); Lianhui Cai, Zhongshan (CN); Jianzhao Li, Zhongshan (CN)

(73) Assignee: ELITE ELECTRONIC MATERIAL (ZHONGSHAN) CO., LTD., Zhongshan (CN)

( * ) Notice: Subject to any disclaimer, the term of this patent is extended or adjusted under 35 U.S.C. 154(b) by 0 days.

(21) Appl. No.: 17/539,541

(22) Filed: Dec. 1, 2021

(30) Foreign Application Priority Data

Oct. 22, 2021 (CN) .......................... 202111233788.7

(51) Int. Cl.
| | |
|---|---|
| C08K 5/541 | (2006.01) |
| C08L 79/08 | (2006.01) |
| C08L 71/12 | (2006.01) |
| C08K 5/5425 | (2006.01) |
| C08K 5/54 | (2006.01) |
| C07F 7/08 | (2006.01) |
| C07F 9/53 | (2006.01) |

(52) U.S. Cl.
CPC ............ C08K 5/541 (2013.01); C07F 7/0812 (2013.01); C07F 9/5325 (2013.01); C08K 5/5406 (2013.01); C08K 5/5425 (2013.01); C08L 71/12 (2013.01); C08L 71/126 (2013.01); C08L 79/08 (2013.01)

(58) Field of Classification Search
CPC ...... C08K 5/5406; C08K 5/5425; C08K 5/54; C08K 5/5419; C07F 7/0812; C07F 9/5325
See application file for complete search history.

(56) References Cited

U.S. PATENT DOCUMENTS

2014/0094620 A1* 4/2014 Yang ...................... C08K 5/549
556/405

* cited by examiner

Primary Examiner — Brieann R Johnston
(74) Attorney, Agent, or Firm — Muncy, Geissler, Olds & Lowe, P.C.

(57) ABSTRACT

A phosphorus-containing silane compound has a structure of $SiR_1(R_2)_n(R_3)_{3-n}$, wherein $R_1$ is a phenyl group, $R_2$ is a vinyl group, $R_3$ each independently is a structure of Formula (I) or Formula (II), and n is 1 or 2. Moreover, a method of making the phosphorus-containing silane compound, a resin composition including the phosphorus-containing silane compound and a resin additive and an article made from the resin composition are described. The article includes a prepreg, a resin film, a laminate or a printed circuit board, wherein one or more properties including Z-axis ratio of thermal expansion, copper foil peeling strength, inner resin flow, branch-like pattern, dielectric constant, dissipation factor and flame retardancy may be improved.

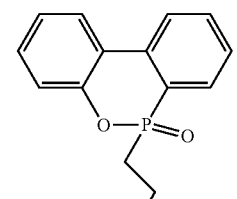

Formula (I)

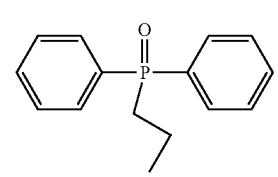

Formula (II)

17 Claims, 2 Drawing Sheets

PHOSPHORUS-CONTAINING SILANE COMPOUND, METHOD OF MAKING THE SAME, RESIN COMPOSITION AND ARTICLE MADE THEREFROM

CROSS-REFERENCE TO RELATED APPLICATION

This application claims the priority benefits of China Patent Application No. 202111233788.7, filed on Oct. 22, 2021. The entirety the above-mentioned patent application is hereby incorporated by reference herein and made a part of this specification.

BACKGROUND

1. Field of the Disclosure

The present disclosure relates to a phosphorus-containing silane compound, a method of making the same, a resin composition and an article made therefrom, more particularly to a reactive phosphorus-containing silane compound for the fabrication of a prepreg, a resin film, a laminate (e.g., a copper-clad laminate) and a printed circuit board, a method of making the same, a resin composition and an article made therefrom.

2. Description of Related Art

Recently, the electronic technology has been developed towards higher density, lower power consumption and higher performance, thereby presenting more challenges to the high performance electronic materials.

In view of higher interconnection density per unit area of electronic devices, in order to increase the interconnectivity and installation reliability of the electronic devices, the materials need to achieve lower ratio of thermal expansion to ensure higher dimensional stability which is important to the alignment and positioning during the subsequent printed circuit board fabrication. In addition, the materials need to have sufficient adhesion strength to ensure strong connection with the metal traces and prevent failure due to separation of the traces.

Therefore, there is an urgent need to provide a solution for lowering the ratio of thermal expansion of insulation layers without deteriorating other properties, particularly copper foil peeling strength, dielectric properties, flame retardancy, etc.

SUMMARY

To overcome the problems of prior arts, particularly one or more above-mentioned technical problems facing conventional materials, it is a primary object of the present disclosure to provide a phosphorus-containing silane compound and a method of making the same which may overcome at least one of the above-mentioned technical problems. In addition, the present disclosure further provides a resin composition and an article made therefrom which may overcome at least one of the above-mentioned technical problems.

On the other hand, in order to overcome the foregoing disadvantages of prior arts, particularly the deterioration of some properties of insulation material or resin composition, such as branch-like pattern at laminate edges or low inner resin flow, caused by using conventional flame retardant materials in the insulation material or resin composition to provide flame retardancy, the present disclosure provides a reactive phosphorus-containing silane compound useful in a resin composition to make articles such as a prepreg, a resin film, a laminate and a printed circuit board, thereby improving one or more properties of the articles such as Z-axis ratio of thermal expansion, copper foil peeling strength, inner resin flow, branch-like pattern, dielectric constant, dissipation factor and flame retardancy.

In one aspect, provided herein is a phosphorus-containing silane compound having a structure of $SiR_1(R_2)_n(R_3)_{3-n}$:

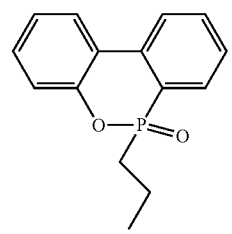

Formula (I)

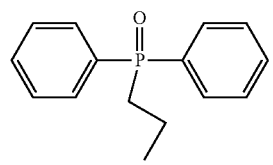

Formula (II)

wherein $R_1$ is a phenyl group, $R_2$ is a vinyl group, $R_3$ each independently is a structure of Formula (I) or Formula (II), and n is 1 or 2.

In one embodiment, the phosphorus-containing silane compound has a structure represented by any one of the following Formula (III) to Formula (VI):

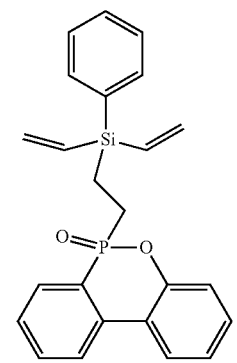

Formula (III)

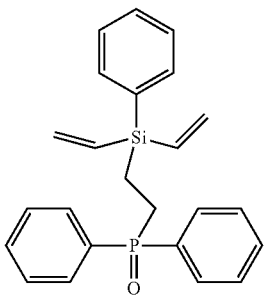

Formula (IV)

-continued

Formula (V)

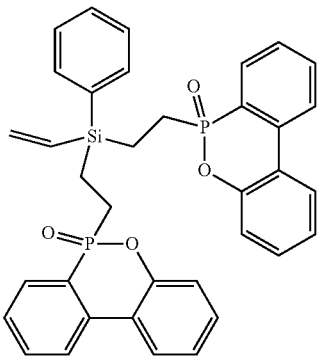

Formula (VI)

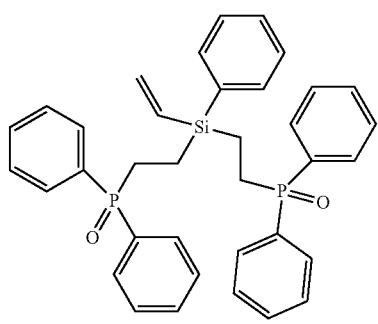

In another aspect, provided herein is a method of making the phosphorus-containing silane compound, comprising a step of reacting phenyltrivinylsilane with 9,10-dihydro-9-oxa-10-phosphaphenanthrene-10-oxide (DOPO) or diphenylphosphine oxide (DPPO) at a temperature of 160° C. to 200° C. A temperature of 160° C. to 200° C. is the temperature reached by heating after phenyltrivinylsilane and 9,10-dihydro-9-oxa-10-phosphaphenanthrene-10-oxide or diphenylphosphine oxide have been melted.

In one embodiment, solvent and initiator are not used in the reaction of phenyltrivinylsilane and 9,10-dihydro-9-oxa-10-phosphaphenanthrene-10-oxide or diphenylphosphine oxide.

In one embodiment, a molar ratio of a reactive functional group of phenyltrivinylsilane to a reactive functional group of 9,10-dihydro-9-oxa-10-phosphaphenanthrene-10-oxide or a reactive functional group of diphenylphosphine oxide is between 3:1 and 3:2.

In another aspect, the present disclosure provides a resin composition comprising the aforesaid phosphorus-containing silane compound and a resin additive.

In one embodiment, the resin additive comprises a vinyl-containing resin, a styrene maleic anhydride resin, an epoxy resin, a phenolic resin, a benzoxazine resin, a cyanate ester resin, a polyester resin, a polyamide resin, a polyimide resin or a combination thereof.

In one embodiment, the vinyl-containing resin comprises a vinyl-containing polyphenylene ether resin, a maleimide resin, a maleimide triazine resin, a polyolefin resin, styrene, divinylbenzene, bis(vinylbenzyl) ether, 1,2,4-trivinyl cyclohexane, bis(vinylphenyl)ethane, bis(vinylphenyl)hexane, bis(vinylphenyl) dimethyl ether, bis(vinylphenyl) dimethyl benzene, triallyl isocyanurate, triallyl cyanurate, a prepolymer of any one of the foregoing components or a combination thereof.

In one embodiment, the vinyl-containing polyphenylene ether resin comprises a vinylbenzyl-terminated polyphenylene ether resin, a methacrylate-terminated polyphenylene ether resin or a combination thereof.

In one embodiment, the vinylbenzyl-terminated polyphenylene ether resin and the methacrylate-terminated polyphenylene ether resin respectively comprise a structure of Formula (VII) and a structure of Formula (VIII):

Formula (VII)

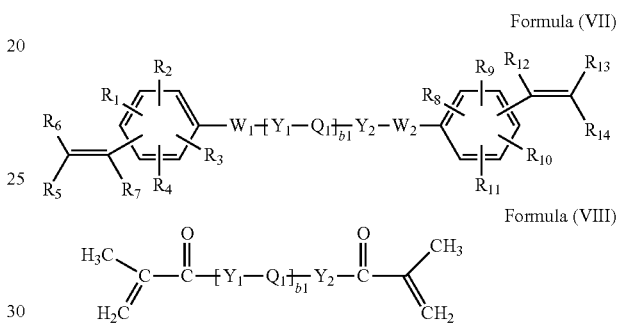

Formula (VIII)

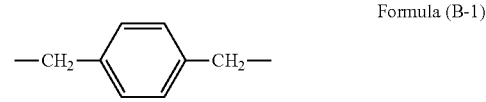

wherein $R_1$ to $R_{14}$ are individually H or —$CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

Formula (B-1)

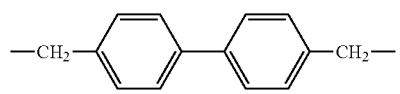

Formula (B-2)

(within image above)

Formula (B-3)

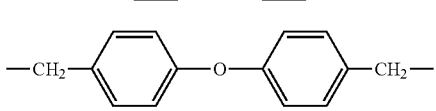

$Y_1$ and $Y_2$ independently comprise a structure of Formula (B-4):

Formula (B-4)

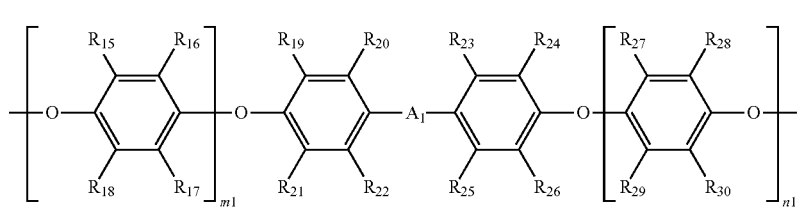

wherein $R_{15}$ to $R_{30}$ are independently H or —CH$_3$; m1 and n1 independently represent an integer of 1 to 30; and $A_1$ is selected from a covalent bond, —CH$_2$—, —CH(CH$_3$)—, —C(CH$_3$)$_2$—, —O—, —S—, —SO$_2$— and a carbonyl group.

In one embodiment, the maleimide resin comprises 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, maleimide resin containing aliphatic long-chain structure or a combination thereof.

In one embodiment, the resin composition comprises 10 parts by weight to 60 parts by weight of the maleimide resin and 30 parts by weight to 70 parts by weight of the phosphorus-containing silane compound relative to 100 parts by weight of the vinyl-containing polyphenylene ether resin.

In one embodiment, the resin composition further optionally comprises amine curing agent, flame retardant, inorganic filler, curing accelerator, polymerization inhibitor, coloring agent, solvent, toughening agent, silane coupling agent or a combination thereof.

In another aspect, the present disclosure provides an article made from the resin composition described above, which comprises a prepreg, a resin film, a laminate or a printed circuit board.

In one embodiment, articles made from the resin composition disclosed herein have one, more or all of the following properties:
  a Z-axis ratio of thermal expansion as measured by reference to IPC-TM-650 2.4.24.5 of less than or equal to 2.60%;
  a copper foil peeling strength as measured by reference to IPC-TM-650 2.4.8 of greater than or equal to 3.30 lb/in;
  an inner resin flow after lamination of the article (such as a sample for inner resin flow test) of greater than or equal to 5.0 mm;
  having a surface (such as a surface of a copper-free laminate) absent of branch-like pattern under visual inspection;
  a dielectric constant at 10 GHz as measured by reference to JIS C2565 of less than or equal to 3.65;
  a dissipation factor at 10 GHz as measured by reference to JIS C2565 of less than or equal to 0.0053; and
  a flame retardancy of V-0 as measured by reference to UL 94 rating.

DESCRIPTION OF THE EMBODIMENTS

Figure 1:
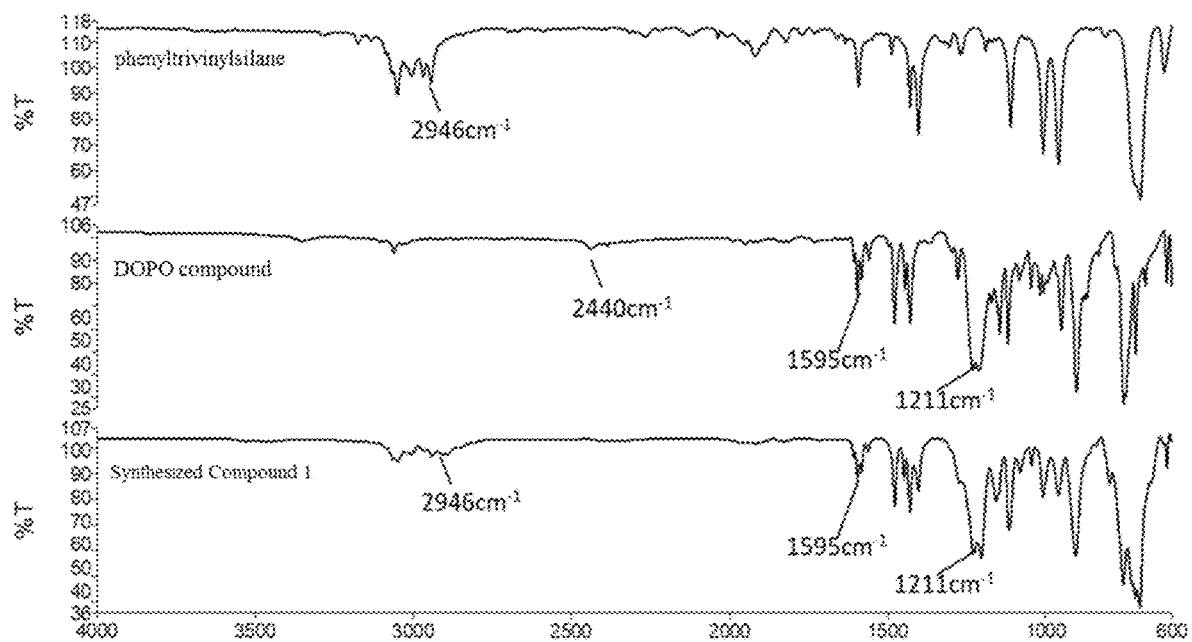
FIG. 1 illustrates the FTIR spectrums of the Synthesized Compound 1 and the raw materials phenyltrivinylsilane and DOPO compound respectively.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having," "encompasses," "encompassing," or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompasses," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

The following embodiments and examples are illustrative in nature and are not intended to limit the present disclosure and its application. In addition, the present disclosure is not bound by any theory described in the background and summary above or the following embodiments or examples.

As used herein, part(s) by weight represents weight part(s) in any weight unit, such as but not limited to kilogram, gram, pound and so on. For example, 100 parts by weight of a vinyl-containing polyphenylene ether resin may represent 100 kilograms of the vinyl-containing polyphenylene ether resin or 100 pounds of the vinyl-containing polyphenylene ether resin.

As used herein, "or a combination thereof" means "or any combination thereof".

Unless otherwise specified, according to the present disclosure, a resin may include a compound and/or a mixture. A compound may include a monomer or a polymer. A mixture may include two or more compounds and may include a copolymer or auxiliaries, but not limited thereto.

For example, a compound refers to a chemical substance formed by two or more elements bonded with chemical bonds and may be present as a monomer, a polymer, etc., but not limited thereto. Any compound disclosed herein is interpreted to not only include a single chemical substance but also include a class of chemical substances having the same kind of components or having the same property. In addition, as used herein, a mixture refers to a combination of two or more compounds. A monomer refers to a compound which may participate in a polymerization or prepolymerization reaction to produce a high molecular weight compound. A homopolymer refers to a chemical substance formed by a single compound via polymerization, addition polymerization or condensation polymerization, and a copolymer refers to a chemical substance formed by two or more compounds via polymerization, addition polymerization or condensation polymerization, but not limited thereto. In addition, as used herein, the term "polymer" includes but is not limited to an oligomer. An oligomer refers to a polymer with 2 to 20, typically 2 to 5, repeating units.

As used herein, a vinyl group refers to the presence of an ethylenic carbon-carbon double bond (C=C) functional group in a compound. Unless otherwise specified, the position of the aforesaid functional group is not particularly limited and may be located at the terminal of a long-chain structure. Therefore, for example, a vinyl-containing polyphenylene ether resin represents a polyphenylene ether resin containing a vinyl group, a vinylene group, an allyl group, a vinylbenzyl group, a methacrylate group or the like, but not limited thereto. Unless otherwise specified, "vinyl-containing" refers to the presence of an ethylenic carbon-carbon double bond (C=C) or a functional group derived therefrom in a compound structure, such as, but not limited to, the presence of a vinyl group, a vinylene group, an allyl group, a vinylbenzyl group, a methacrylate group or the like in a compound structure.

As described above, the present disclosure primarily provides a phosphorus-containing silane compound having a structure of $SiR_1(R_2)_n(R_3)_{3-n}$:

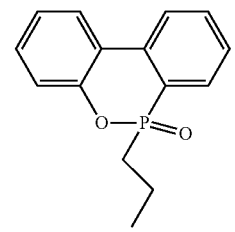

Formula (I)

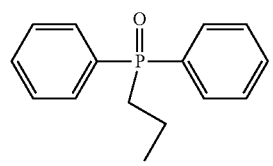

Formula (II)

wherein $R_1$ is a phenyl group, $R_2$ is a vinyl group, $R_3$ each independently is a structure of Formula (I) or Formula (II), and n is 1 or 2.

For example, in one embodiment, n is 1 and each $R_3$ is a 9,10-dihydro-9-oxa-10-phosphaphenanthrene-10-oxide group; for example, in one embodiment, n is 1 and both $R_3$ are a diphenylphosphine oxide group; for example, in one embodiment, n is 1, one $R_3$ is a 9,10-dihydro-9-oxa-10-phosphaphenanthrene-10-oxide group and the other $R_3$ is a diphenylphosphine oxide group; for example, in one embodiment, n is 2 and $R_3$ is a 9,10-dihydro-9-oxa-10-phosphaphenanthrene-10-oxide group; for example, in one embodiment, n is 2 and $R_3$ is a diphenylphosphine oxide group.

For example, in one embodiment, the phosphorus-containing silane compound may serve as a reactive flame retardant compound which has the following advantages: a high phosphorus content of up to 10%, such that a small addition amount is sufficient to achieve an excellent silicon-phosphorus synergistic flame retardancy effect; low molecular polarity and high dielectric performance; presence of one or two vinyl groups for crosslinking with a resin, thereby preventing the problem of migration and precipitation of conventional flame retardants; having a low melting point and being a soft solid at ambient temperature, having a low melt viscosity, capable of increasing the fluidity of a resin and enhancing the resin filling property of the resin composition; excellent solubility and being soluble in solvents such as methyl ethyl ketone and toluene, while other non-reactive compounds containing a 9,10-dihydro-9-oxa phosphaphenanthrene-10-oxide group or a diphenylphosphine oxide group are not soluble in solvents such as methyl ethyl ketone and toluene, such as the non-reactive phosphorus-containing silane 1 (Formula (XII)) and non-reactive phosphorus-containing silane 2 (Formula (XIII)).

For example, in one embodiment, since the phosphorus-containing silane compound disclosed herein does not contain a high polarity and strong water-absorbing group, such as a hydroxyl group, it has excellent dielectric properties, and when being used in high speed and high frequency signal transmission, it can provide flame retardancy without substantially affecting or worsening the dielectric properties such as Dk and Df of the material.

For example, in one embodiment, compared with known phosphorus-containing siloxane flame retardants, such as conventional phosphorus-containing siloxane flame retardants having a high molecular weight (usually a polymer or a mixture), the phosphorus-containing silane compound disclosed herein is highly compatible with other resins, therefore not causing the problems of branch-like pattern, poor inner resin flow, etc.

For example, in one embodiment, the phosphorus-containing silane compound disclosed herein has any one structure represented by the following Formula (III) or Formula (VI):

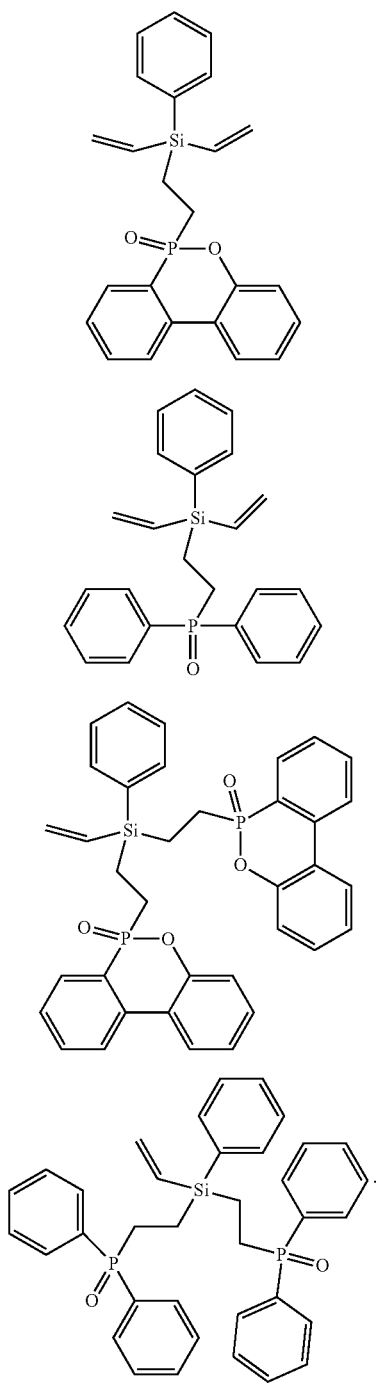

Formula (III)

Formula (IV)

Formula (V)

Formula (VI)

Another main object of the present disclosure is to provide a method of making the phosphorus-containing silane compound, comprising a step of reacting phenyltrivinylsilane with 9,10-dihydro-9-oxa-10-phosphaphenanthrene-10-oxide or diphenylphosphine oxide at a temperature of 160° C. to 200° C.

For example, the phosphorus-containing silane compound may be obtained by reacting phenyltrivinylsilane with 9,10-dihydro-9-oxa-10-phosphaphenanthrene-10-oxide or diphenylphosphine oxide under heating.

For example, in one embodiment, the heating time may range from 1 hour to 6 hours, such as between 2 hours and 6 hours or between 3 hours and 5 hours. The reaction temperature may range from 160° C. to 200° C., such as between 170° C. and 200° C. or between 180° C. and 190° C.

For example, in one embodiment, a solvent and an initiator are not used during the reaction. The addition of an initiator will cause self-polymerization of phenyltrivinylsilane thereby failing to obtain the phosphorus-containing silane compound. The addition of a solvent will dilute the concentration of phenyltrivinylsilane and 9,10-dihydro-9-oxa-10-phosphaphenanthrene-10-oxide or diphenylphosphine oxide, thereby lowering the yield of the phosphorus-containing silane compound.

In one embodiment, the amounts of phenyltrivinylsilane and 9,10-dihydro-9-oxa-10-phosphaphenanthrene-10-oxide or diphenylphosphine oxide compound are not particularly limited.

In one embodiment, a molar ratio of a reactive functional group of phenyltrivinylsilane to a reactive functional group of 9,10-dihydro-9-oxa-10-phosphaphenanthrene-10-oxide or a reactive functional group of diphenylphosphine oxide is between 3:1 and 3:2 (mole of reactive functional group= (compound mass/compound molecular weight)*number of reactive functional group in the compound). In one embodiment, the molar ratio of the vinyl group in phenyltrivinylsilane to the phosphorus-containing flame retardant functional group (i.e., —P—H group) is between 3:1 and 3:2. In one embodiment, the molar ratio of the vinyl group in phenyltrivinylsilane to the phosphorus-containing flame retardant functional group in 9,10-dihydro-9-oxa-10-phosphaphenanthrene-10-oxide is 3:1. In one embodiment, the molar ratio of the vinyl group in phenyltrivinylsilane to the phosphorus-containing flame retardant functional group in diphenylphosphine oxide is 3:2.

In one embodiment, a molar ratio of phenyltrivinylsilane to 9,10-dihydro-9-oxa-10-phosphaphenanthrene-10-oxide or the diphenylphosphine oxide compound is between 1:1 and 1:2.

For example, in one embodiment, the reactive phosphorus-containing silane compound may be obtained after the reaction.

In one embodiment, the compounds of Formula (III), Formula (IV), Formula (V), and Formula (VI) are prepared as follows.

Preparation Example 1

In the presence of nitrogen gas protection, to a three-necked flask, 1.0 mole of phenyltrivinylsilane (containing 3.0 moles of vinyl group) and 1.0 mole of 9,10-dihydro-9-oxa-10-phosphaphenanthrene-10-oxide (i.e., a DOPO compound, containing 1.0 mole of phosphorus-containing flame retardant functional group) were added, the temperature was increased to 190° C., the reaction was stirred for 1 to 6 hours, and then the temperature was lowered to room temperature after the reaction to obtain the product, which contained a large amount of Synthesized Compound 1 (having a structure of Formula (III)) and a small amount of Synthesized Compound 3 (having a structure of Formula (V)), wherein the yield of the Synthesized Compound 1 is 95% or higher and the yield of the Synthesized Compound 3 is between 1% and 3%.

FIG. 1 illustrates the FTIR spectrums of the Synthesized Compound 1 (bottom spectrum) and the raw materials phenyltrivinylsilane (top spectrum) and DOPO compound (middle spectrum) respectively.

In the FTIR spectrum of the DOPO compound, an absorption peak of P—H bond stretch vibration at 2440 $cm^{-1}$ can be observed. It can be observed that in the FTIR spectrum of the Synthesized Compound 1, an absorption peak of P—H bond stretch vibration at 2440 $cm^{-1}$ was disappeared, indicating that the P—H bond in the DOPO compound was completely reacted; the peak representing the vinyl group at 1600 $cm^{-1}$ was covered by a new P=O peak at 1595 $cm^{-1}$; the P—O peak at 1211 $cm^{-1}$ indicated that the double bonds of the phenyltrivinylsilane were reacted with the DOPO compound, and a P=O bond was formed in the Synthesized Compound 1; a saturated C—H absorption peak at 2946 $cm^{-1}$ remained, indicating that the DOPO compound was reacted with phenyltrivinylsilane and the double bonds of phenyltrivinylsilane and the DOPO compound were already reacted and bonded with the DOPO group.

Preparation Example 2

In the presence of nitrogen gas protection, to a three-necked flask, 1.0 mole of phenyltrivinylsilane (containing 3.0 moles of vinyl group) and 1.0 mole of diphenylphosphine oxide (i.e., a DPPO compound, containing 1.0 mole of phosphorus-containing flame retardant functional group) were added, the temperature was increased to 160° C. to 190° C., the reaction was stirred for 1 to 6 hours, and then the temperature was lowered to room temperature after the reaction to obtain the product, which contained a large amount of Synthesized Compound 2 (having a structure of Formula (IV)) and a small amount of Synthesized Compound 4 (having a structure of Formula (VI)), wherein the yield of the Synthesized Compound 2 is 95% or higher and the yield of the Synthesized Compound 4 is between 1% and 3%.

Preparation Example 3

In the presence of nitrogen gas protection, to a three-necked flask, 1.0 mole of phenyltrivinylsilane (containing 3.0 moles of vinyl group) and 2.0 moles of 9,10-dihydro-9-oxa-10-phosphaphenanthrene-10-oxide (i.e., a DOPO compound, containing 2.0 moles of phosphorus-containing flame retardant functional group) were added, the temperature was increased to 160° C. to 200° C., the reaction was stirred for 1 to 6 hours, and then the temperature was lowered to room temperature after the reaction to obtain the product, which contained a large amount of Synthesized Compound 3 (having a structure of Formula (V)) and a small amount of Synthesized Compound 1 (having a structure of Formula (III)), wherein the yield of the Synthesized Compound 3 is 95% or higher and the yield of the Synthesized Compound 1 is between 1% and 3%.

Preparation Example 4

In the presence of nitrogen gas protection, to a three-necked flask, 1.0 mole of phenyltrivinylsilane (containing 3.0 moles of vinyl group) and 2.0 moles of diphenylphosphine oxide (i.e., a DPPO compound, containing 2.0 moles of phosphorus-containing flame retardant functional group) were added, the temperature was increased to 160° C. to 200° C., the reaction was stirred for 1 to 6 hours, and then the temperature was lowered to room temperature after the reaction to obtain the product, which contained a large amount of Synthesized Compound 4 (having a structure of Formula (VI)) and a small amount of Synthesized Compound 2 (having a structure of Formula (IV)), wherein the yield of the Synthesized Compound 4 is 95% or higher and the yield of the Synthesized Compound 2 is between 1% and 3%.

Comparative Preparation Example 1

In the presence of nitrogen gas protection, to a three-necked flask, 1.0 mole of phenyltrivinylsilane (containing 3.0 moles of vinyl group) and 1.0 mole of 9,10-dihydro-9-oxa-10-phosphaphenanthrene-10-oxide (i.e., a DOPO compound, containing 1.0 mole of phosphorus-containing flame retardant functional group) were added, and 0.5% of a free radical initiator (such as 2,5-dimethyl-2,5-di(tert-butylperoxy)-3-hexyne peroxide, product name 25B, available from NOF Corporation) based on the total amount of phenyltrivinylsilane and the DOPO compound was added; the temperature was increased to 160° C. to 200° C., and gelation occurred during stirring, thereby failing to obtain the Synthesized Compound 1.

Comparative Preparation Example 2

In the presence of nitrogen gas protection, to a three-necked flask, 1.0 mole of phenyltrivinylsilane (containing 3.0 moles of vinyl group) and 1.0 mole of 9,10-dihydro-9-oxa-10-phosphaphenanthrene-10-oxide (i.e., a DOPO compound, containing 1.0 mole of phosphorus-containing flame retardant functional group) were added, and 0.5% of a free radical initiator (such as 2,5-dimethyl-2,5-di(tert-butylperoxy)-3-hexyne peroxide, product name 25B, available from NOF Corporation) based on the total amount of phenyltrivinylsilane and the DOPO compound and a proper amount of solvent (e.g., toluene, xylene, or dimethyl acetamide, such that a desired solid content of the solution was 50 wt % to 70 wt %) was added; the temperature was increased to 160° C. to 200° C., and gelation occurred during stirring, thereby failing to obtain the Synthesized Compound 1.

Another main object of the present disclosure is to provide a resin composition comprising the phosphorus-containing silane compound and a resin additive.

According to the present disclosure, the phosphorus-containing silane compound may be used as a reactive flame retardant in a resin composition, and the amount of the phosphorus-containing silane compound is not particularly limited, such as an amount useful for achieving a flame retardancy of V-0 according to the UL 94 rating for the resin composition.

Unless otherwise specified, the resin additive used in the resin composition of the present disclosure is not particularly limited and may include various resin additives or a combination thereof useful for preparing a prepreg, a resin film, a laminate or a printed circuit board.

For example, in one embodiment, the resin additive comprises a vinyl-containing resin, a styrene maleic anhydride resin, an epoxy resin, a phenolic resin, a benzoxazine resin, a cyanate ester resin, a polyester resin, a polyamide resin, a polyimide resin or a combination thereof.

For example, in one embodiment, the resin additive comprises a vinyl-containing resin. Examples of the vinyl-containing resin include but are not limited to a resin containing one or more carbon-carbon double bonds. For example, the vinyl-containing resin comprises, but not limited to, a vinyl-containing polyphenylene ether resin, a maleimide resin, a maleimide triazine resin, a polyolefin resin, styrene, divinylbenzene, bis(vinylbenzyl) ether, 1,2,4-trivinylcyclohexane (TVCH), bis(vinylphenyl)ethane (BVPE), bis(vinylphenyl)hexane, bis(vinylphenyl) dimethyl ether, bis(vinylphenyl) dimethyl benzene, triallyl isocyanurate (TAIC), and/or triallyl cyanurate (TAC). In one embodiment, the vinyl-containing resin comprises a prepolymer of any one of the foregoing components. In one embodiment, the vinyl-containing resin comprises any one of the foregoing components, a prepolymer of any one of the foregoing components, or a combination thereof.

For example, in one embodiment, the vinyl-containing polyphenylene ether resin used herein refers to a polyphenylene ether compound or mixture having an ethylenic carbon-carbon double bond (C=C) or a functional group derived therefrom. Examples of the ethylenic carbon-carbon double bond (C=C) or the functional group derived therefrom may include, but not limited to, a structure containing a vinyl group, a vinylene group, an allyl group, a vinylbenzyl group, a methacrylate group or the like. Unless otherwise specified, the position of the aforesaid functional group is not particularly limited and may be located at the terminal of a long-chain structure. In other words, the vinyl-containing polyphenylene ether resin described herein represents a polyphenylene ether resin containing a reactive vinyl group or a functional group derived therefrom, examples including but not limited to a polyphenylene ether resin containing a vinyl group, a vinylene group, an allyl group, a vinylbenzyl group, or a methacrylate group.

For example, in one embodiment, the vinyl-containing polyphenylene ether resin described herein comprises a vinylbenzyl-terminated polyphenylene ether resin, a methacrylate-terminated polyphenylene ether resin (i.e., methacryl-terminated polyphenylene ether resin), an allyl-terminated polyphenylene ether resin or a combination thereof.

For example, the vinylbenzyl-terminated polyphenylene ether resin and the methacrylate-terminated polyphenylene ether resin respectively comprise a structure of Formula (VII) and a structure of Formula (VIII):

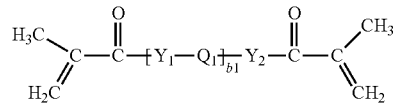

Formula (VII)

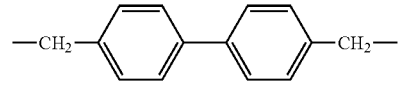

Formula (VIII)

wherein $R_1$ to $R_{14}$ are individually H or —$CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

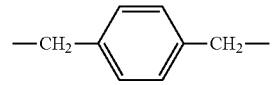

Formula (B-1)

Formula (B-2)

Formula (B-3)

$Y_1$ and $Y_2$ independently comprise a structure of Formula (B-4):

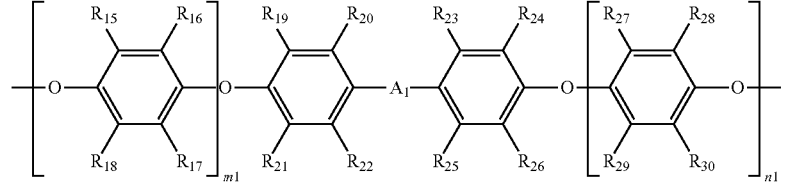

Formula (B-4)

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

For example, the vinyl-containing polyphenylene ether resin may be SA9000 available from Sabic, a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the maleimide resin used herein refers to a compound or a mixture containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylyl maleimide, N-2,6-xylylmaleimide, N-phenylmaleimide, maleimide resin containing aliphatic long-chain structure or a combination thereof. In addition, unless otherwise specified, the aforesaid maleimide resin of the present disclosure may also comprise a prepolymer thereof, such as a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., products such as BMI-70 and BMI-80 available from K.I Chemical Industry Co., Ltd, or products such as D928, D930, D932, D934, D936, D937 and D938 available from Sichuan EM Technology Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc. For example, the maleimide resin containing aliphatic long chain structure may have at least one maleimide group bonded with a substituted or unsubstituted long-chain aliphatic group. The long-chain aliphatic group may be a $C_5$ to $C_{50}$ aliphatic group, such as $C_{10}$ to $C_{50}$, $C_{20}$ to $C_{50}$, $C_{30}$ to $C_{50}$, $C_{20}$ to $C_{40}$, or $C_{30}$ to $C_{40}$, but not limited thereto. Examples of commercial maleimide resins containing aliphatic long-chain structure include:

BMI-689:

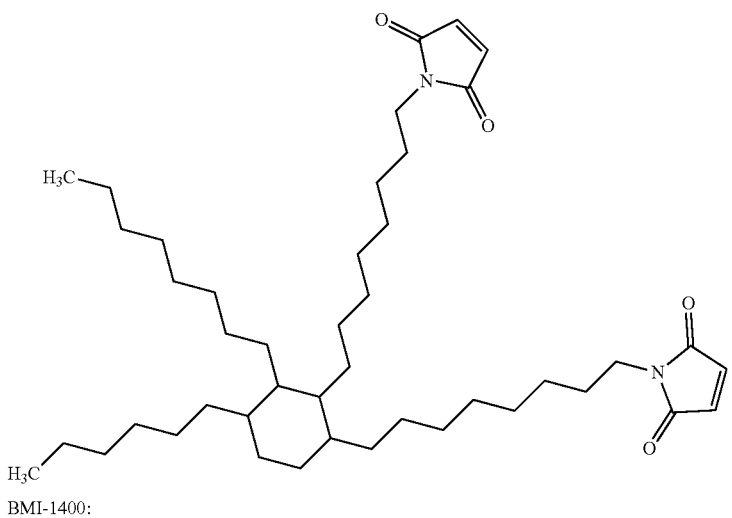

BMI-1400:

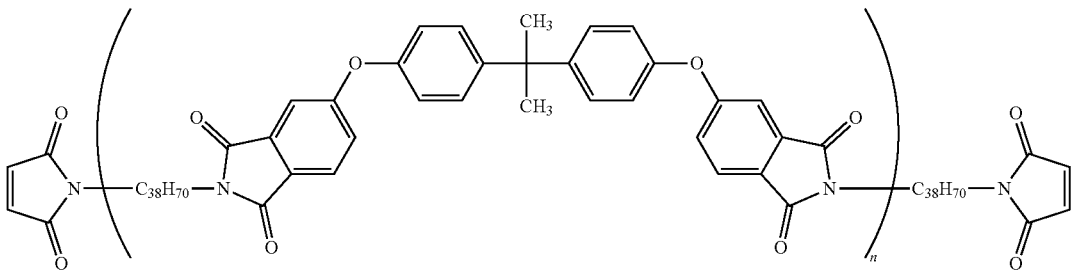

Where n = 1 to 10

BMI-1500:

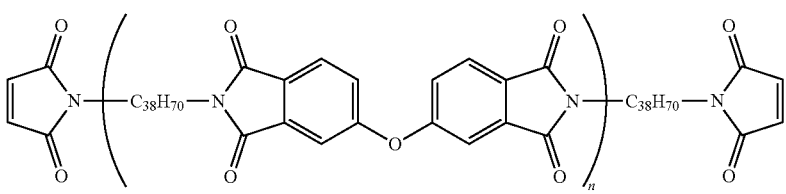

Average n = 1.3

-continued

BMI-1700:

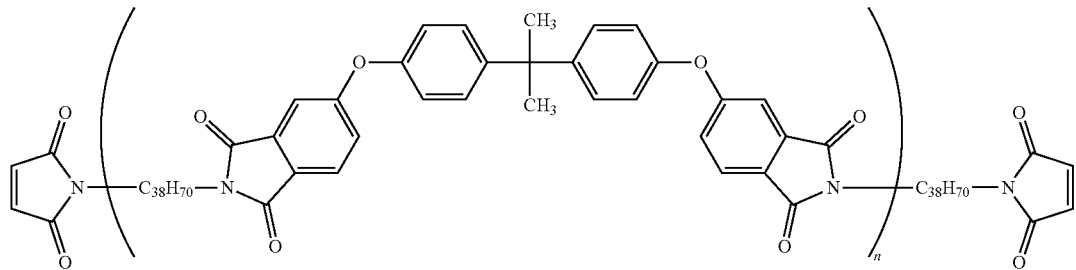

Where n = 1 to 10

BMI-1250:

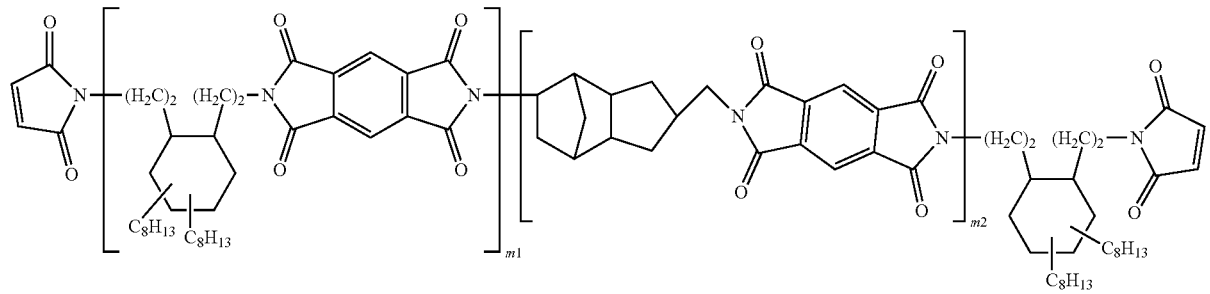

m1 = 3(average); m2 = 3(average)

BMI-3000, BMI-5000, BMI-6000:

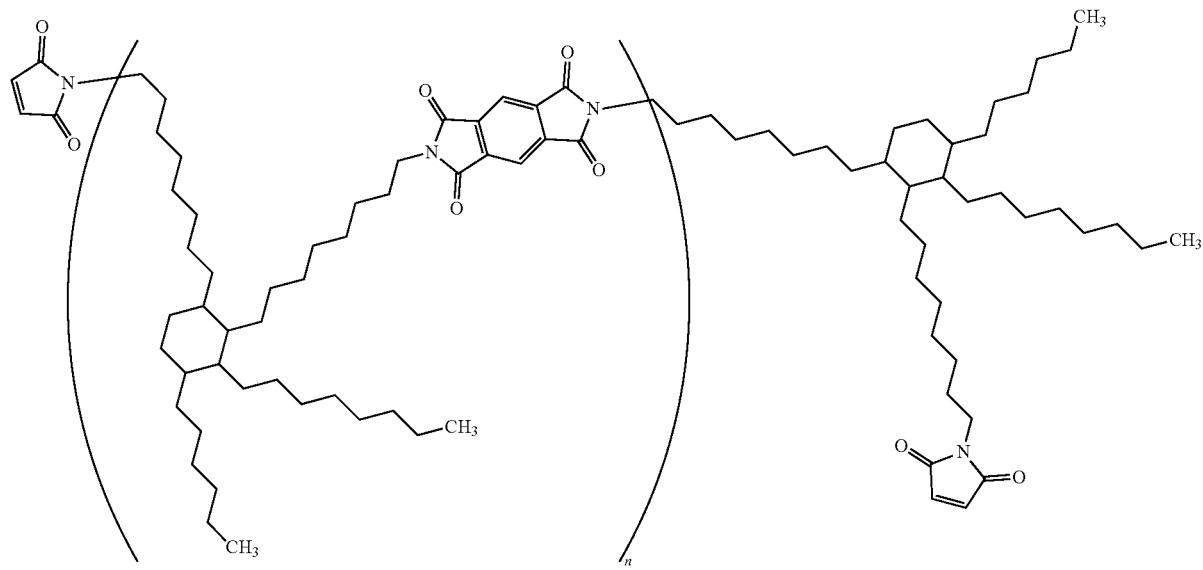

Where n = 1 to 10

For example, in one embodiment, the styrene maleic anhydride resin used herein may have a ratio of styrene (S) to maleic anhydride (MA) of 1:1, 2:1, 3:1, 4:1, 6:1, or 8:1, examples including but not limited to styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 available from Cray Valley. Unless otherwise specified, the styrene maleic anhydride resin can be added individually or as a combination to the resin composition of this disclosure.

For example, in one embodiment, the polyolefin resin described herein may include any one or more polyolefin resins useful for preparing a prepreg, a resin film, a laminate or a printed circuit board. Examples include but are not limited to styrene-butadiene-divinylbenzene terpolymer, styrene-butadiene-maleic anhydride terpolymer, styrene-butadiene-styrene terpolymer; vinyl-polybutadiene-urethane oligomer, styrene-butadiene copolymer, hydrogenated styrene-butadiene copolymer, styrene-isoprene copolymer, hydrogenated styrene-isoprene copolymer, polybutadiene, methylstyrene homopolymer, petroleum resin, cycloolefin copolymer and a combination thereof.

For example, in one embodiment, the epoxy resin as used herein may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, in one embodiment, the phenolic resin described herein may be a mono-functional, bifunctional or multi-functional phenolic resin. The type of the phenolic resin is not particularly limited and may include those currently used in the field to which this disclosure pertains. Preferably, the phenolic resin is selected from a phenoxy resin, a novolac resin and a combination thereof.

For example, in one embodiment, the benzoxazine resin described herein may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, in one embodiment, the cyanate ester resin described herein may include any known cyanate ester resins used in the art, including but not limited to a cyanate ester resin with an Ar—O—C≡N structure (wherein Ar represents an aromatic group, such as benzene, naphthalene or anthracene), a phenol novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, a phenolphthalein cyanate ester resin, or a combination thereof. Examples of the cyanate ester resin include but are not limited to Primaset PT-15, PT-30S, PT-60S, BA-200, BA-230S, BA-3000S, BTP-2500, BTP-6020S, DT-4000, DT-7000, ULL950S, HTL-300, CE-320, LUT-50, or LeCy available from Lonza.

For example, in one embodiment, the polyester resin described herein may be obtained by esterification of an aromatic compound with two carboxylic groups and an aromatic compound with two hydroxyl groups, such as but not limited to HPC-8000, HPC-8150 or HPC-8200 available from DIC Corporation.

For example, in one embodiment, the polyamide resin described herein may be any polyamide resins known in the field to which this disclosure pertains, including but not limited to various commercially available polyamide resin products.

For example, in one embodiment, the polyimide resin described herein may be any polyimide resins known in the field to which this disclosure pertains, including but not limited to various commercially available polyimide resin products.

For example, in one embodiment, the maleimide triazine resin described in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. The maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, when used in combination, the phosphorus-containing silane compound disclosed herein as a reactive flame retardant and any one or more resin additives described above may effectively improve one or more properties of the resin composition. For example, the phosphorus-containing silane compound of the present disclosure may achieve better inner resin flow, lower ratio of thermal expansion and absence of branch-like pattern in various resin systems such as maleimide resin (BMI), polyphenylene ether resin (PPO), polyolefin resin and the like. Preferably, when the phosphorus-containing silane compound is used in conjunction with a vinyl-containing resin, such as polyphenylene ether resin, maleimide resin, etc., the article made therefrom may achieve a better balance between excellent overall properties and costs.

Unless otherwise specified, the amount or ratio of the phosphorus-containing silane compound and the resin additive is not particularly limited.

For example, in one embodiment, the resin composition comprises 100 parts by weight of a vinyl-containing polyphenylene ether resin, 10 parts by weight to 60 parts by weight of a maleimide resin and 30 parts by weight to 70 parts by weight of the phosphorus-containing silane compound.

In one embodiment, in addition to the phosphorus-containing silane compound and the optional one or more resin additives, the resin composition disclosed herein may further optionally comprise amine curing agent, flame retardant, inorganic filler, curing accelerator, polymerization inhibitor, coloring agent, solvent, toughening agent, silane coupling agent or a combination thereof.

For example, in one embodiment, in addition to the vinyl-containing polyphenylene ether resin, the maleimide resin, and the phosphorus-containing silane compound, the resin composition disclosed herein further comprises amine curing agent, flame retardant, inorganic filler, curing accelerator, polymerization inhibitor, coloring agent, solvent, toughening agent, silane coupling agent or a combination thereof.

For example, in one embodiment, the amine curing agent described herein may be dicyandiamide, diamino diphenyl sulfone, diamino diphenyl methane, diamino diphenyl ether, diamino diphenyl sulfide or a combination thereof, but not limited thereto.

For example, in one embodiment, the flame retardant used herein may be any one or more flame retardants useful for preparing a prepreg, a resin film, a laminate or a printed circuit board; examples of the flame retardant include but are not limited to a phosphorus-containing flame retardant, such as any one, two or more selected from the following group: ammonium polyphosphate, hydroquinone bis-(diphenylphosphate), bisphenol A bis-(diphenylphosphate), tri(2-carboxyethyl) phosphine (TCEP), phosphoric acid tris (chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, diphenylphosphine oxide (DPPO) and its derivatives or resins, melamine cyanurate, tri-hydroxy ethyl isocyanurate, aluminium phosphinate (e.g., commercially available OP-930 and OP-935), or a combination thereof.

For example, the flame retardant used herein may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, etc., wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac), etc.

For example, in one embodiment, the inorganic filler used herein may be any one or more fillers used for preparing a resin film, a prepreg, a laminate or a printed circuit board; examples include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, and calcined kaolin. Moreover, the inorganic filler can be spherical, fibrous, plate-like, particulate, flake-like or whisker-like and can be optionally pretreated by a silane coupling agent.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

In one embodiment, for example, the polymerization inhibitor used herein is not particularly limited and may be any polymerization inhibitor known in the field to which this disclosure pertains, including but not limited to various commercially available polymerization inhibitor products. For example, the polymerization inhibitor may comprise, but not limited to, 1,1-diphenyl-2-picrylhydrazyl radical, methyl acrylonitrile, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butyl phenol) or a combination thereof.

For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include such as 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals.

The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

In one embodiment, for example, the coloring agent suitable for the present disclosure may comprise, but not limited to, dye or pigment.

In one embodiment, for example, the purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

In one embodiment, for example, the purpose of adding toughening agent is to improve the toughness of the resin composition. The toughening agent may comprise, but not limited to, carboxyl-terminated butadiene acrylonitrile rubber (CTBN rubber), core-shell rubber, or a combination thereof.

In one embodiment, for example, the silane coupling agent used herein may comprise silane (such as but not limited to siloxane) and may be further categorized according to the functional groups into amino silane compound, epoxide silane compound, vinylsilane compound, acrylate silane compound, methacrylate silane compound, hydroxylsilane compound, isocyanate silane compound, methacryloxy silane compound and acryloxy silane compound.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg may be for example 100° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 150° C. and 300° C. and preferably between 200° C. and 280° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil.

Preferably, the laminate is a copper-clad laminate (CCL).

In addition, the laminate may be further processed by trace formation processes to make a circuit board, such as a printed circuit board.

Preferably, the resin composition of the present disclosure or the article made therefrom may achieve improvement in one or more of the following properties including Z-axis ratio of thermal expansion, copper foil peeling strength, inner resin flow, branch-like pattern, dielectric constant, dissipation factor and flame retardancy.

For example, the resin composition according to the present disclosure or the article made therefrom may achieve one, more or all of the following properties:

- a Z-axis ratio of thermal expansion as measured by reference to IPC-TM-650 2.4.24.5 of less than or equal to 2.60%, such as between 1.95% and 2.60%;
- a copper foil peeling strength as measured by reference to IPC-TM-650 2.4.8 of greater than or equal to 3.30 lb/in, such as between 3.30 lb/in and 3.70 lb/in;
- an inner resin flow after lamination of the article (e.g., sample for inner resin flow test) of greater than or equal to 5.0 mm, such as between 5.0 mm and 12.0 mm;
- a surface of the article (such as a copper-free laminate) absent of branch-like pattern under visual inspection;
- a dielectric constant as measured by reference to JIS C2565 at 10 GHz of less than or equal to 3.65, such as between 3.20 and 3.65;
- a dissipation factor as measured by reference to JIS C2565 at 10 GHz of less than or equal to 0.0053, such as between 0.0035 and 0.0053; and
- a flame retardancy of V-0 as measured by reference to UL 94 rating.

Raw materials below are used to prepare the resin compositions of various Examples and Comparative Examples of the present disclosure according to the amount listed in Table 1 to Table 5 and further fabricated to prepare test samples or articles. Compositions and test results of resin compositions of Examples and Comparative Examples are listed below in Table 1 to Table 5 (in part by weight).

SA9000: methacrylate-terminated polyphenylene ether resin, available from Sabic.

OPE-2st 2200: vinylbenzyl-terminated polyphenylene ether resin, available from Sabic.

BMI-70: aromatic bismaleimide resin, available from K.I Chemical Industry Co., Ltd.

BMI-2300: phenylmethane maleimide polymer resin, available from Daiwakasei Industry Co., Ltd.

BMI-80: aromatic bismaleimide resin, available from K.I Chemical Industry Co., Ltd.

TAIC: triallyl isocyanurate, available from Kingyorker Enterprise Co., Ltd.

B-3000: 1,2-polybutadiene resin, available from Nippon Soda Co., Ltd.

Ricon184MA6: styrene-butadiene-maleic anhydride terpolymer resin, available from Cray Valley.

D-1118: styrene-butadiene-styrene terpolymer resin, available from Kraton Polymers.

Synthesized Compound 1: prepared by PREPARATION EXAMPLE 1.

Synthesized Compound 2: prepared by PREPARATION EXAMPLE 2.

Synthesized Compound 3: prepared by PREPARATION EXAMPLE 3.

Phosphorus-containing siloxane 1: as shown in Formula (IX), wherein n=1.

Phosphorus-containing siloxane 2: as shown in Formula (IX), wherein $1<n\leq10$.

Phosphorus-containing siloxane 3: as shown in Formula (IX), wherein n>10.

Formula (IX)

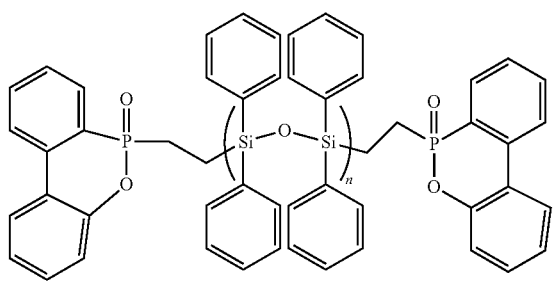

Phosphorus-containing siloxane A with vinyl group: as shown in Formula (X):

Formula (X)

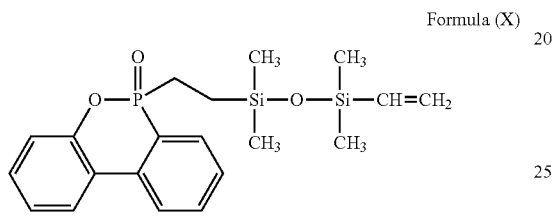

Phosphorus-containing siloxane B with vinyl group: as shown in Formula (XI), wherein A represents DOPO, B is a benzene ring, $R_1$, $R_2$, $R_3$ and $R_4$ are each a phenyl group:

Formula (XI)

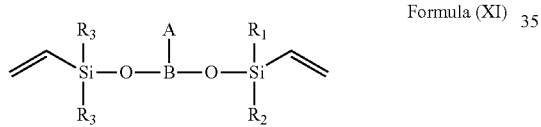

Phosphorus-containing silane 1: as shown in Formula (XII):

Formula (XII)

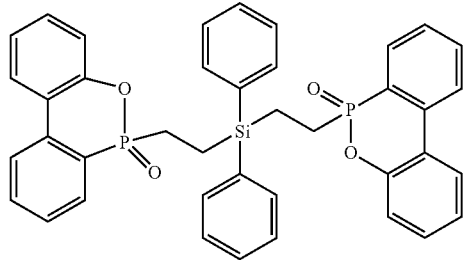

Phosphorus-containing silane 2: as shown in Formula (XIII):

Formula (XIII)

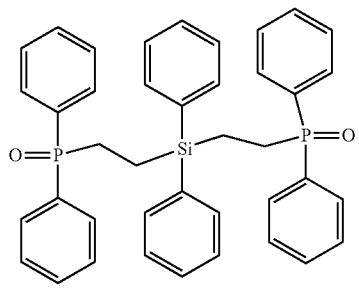

Phosphorus-containing silane coupling agent: as shown in Formula (XIV), wherein X is an isopropenoxy group.

Formula (XIV)

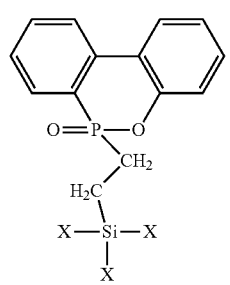

Phenyltrivinylsilane: available from Suzhou Siso New Material Co., Ltd.

DOPO: 9,10-dihydro-9-oxa-10-phosphaphenanthrene-10-oxide, available from Zhengzhou Alfa Chemical Co., Ltd.

SC-2500 SMJ: spherical silica pre-treated by acrylate silane coupling agent, available from Admatechs.

25B: 2,5-dimethyl-2,5-di(t-butylperoxy)-3-hexyne peroxide, having a solid content of 100%, available from NOF Corporation.

Methyl ethyl ketone (MEK): source not limited.

Toluene: available from Chambeco Group.

TABLE 1

| Resin compositions of Examples (in part by weight) and test results | | | | | | | | |
|---|---|---|---|---|---|---|---|---|
| | component | E1 | E2 | E3 | E4 | E5 | E6 | E7 |
| resin additive | SA9000 OPE-2st 2200 | 100 | 100 | 100 | 100 | 100 | 100 | 100 |

TABLE 1-continued

Resin compositions of Examples (in part by weight) and test results

|  |  | | | | | | | |
|---|---|---|---|---|---|---|---|---|
|  | BMI-70 | 40 | 40 | 40 | 40 | 40 | 40 | 40 |
|  | BMI-2300 | | | | | | | |
|  | BMI-80 | | | | | | | |
|  | TAIC | | | | | | | |
|  | B-3000 | | | | | | | |
|  | Ricon184MA6 | | | | | | | |
|  | D-1118 | | | | | | | |
| phosphorus-containing silane compound | Synthesized Compound 1 | 30 | | 50 | | | 70 | |
|  | Synthesized Compound 2 | | 30 | | 50 | | | 70 |
|  | Synthesized Compound 3 | | | | | 50 | | |
| other phosphorus-containing compound | phosphorus-containing siloxane 1 | | | | | | | |
|  | phosphorus-containing siloxane 2 | | | | | | | |
|  | phosphorus-containing siloxane 3 | | | | | | | |
|  | phosphorus-containing siloxane A with vinyl group | | | | | | | |
|  | phosphorus-containing siloxane B with vinyl group | | | | | | | |
|  | phosphorus-containing silane 1 | | | | | | | |
|  | phosphorus-containing silane 2 | | | | | | | |
|  | phosphorus-containing silane coupling agent | | | | | | | |
|  | phenyltrivinylsilane | | | | | | | |
|  | DOPO | | | | | | | |
| inorganic filler | SC-2500 SMJ | 140 | 140 | 140 | 140 | 140 | 140 | 140 |
| curing accelerator | 25B | 1 | 1 | 1 | 1 | 1 | 1 | 1 |
| solvent (SC = 65%-70%) | MEK | PA | PA | PA | PA | PA | PA | PA |
|  | toluene | PA | PA | PA | PA | PA | PA | PA |

| Property test | Unit | E1 | E2 | E3 | E4 | E5 | E6 | E7 |
|---|---|---|---|---|---|---|---|---|
| Z-axis ratio of thermal expansion | % | 2.20 | 2.20 | 2.45 | 2.43 | 2.55 | 2.50 | 2.51 |
| copper foil peeling strength | lb/in | 3.60 | 3.65 | 3.50 | 3.50 | 3.55 | 3.30 | 3.32 |
| inner resin flow | mm | 5.0 | 5.1 | 8.0 | 8.2 | 6.5 | 10.0 | 11.0 |
| branch-like pattern | none | none | none | none | none | none | none | none |
| dielectric constant | none | 3.50 | 3.50 | 3.55 | 3.55 | 3.60 | 3.58 | 3.58 |
| dissipation factor | none | 0.00490 | 0.00490 | 0.00500 | 0.00500 | 0.00520 | 0.00510 | 0.00515 |
| flame retardancy | none | V-0 | V-0 | V-0 | V-0 | V-0 | V-0 | V-0 |

TABLE 2

Resin compositions of Examples (in part by weight) and test results

|  | component | E8 | E9 | E10 | E11 | E12 | E13 | E14 |
|---|---|---|---|---|---|---|---|---|
| resin additive | SA9000 | | 50 | 100 | 100 | 100 | 100 | 100 |
|  | OPE-2st 2200 | 100 | 50 | | | | | |
|  | BMI-70 | 40 | 40 | 40 | 40 | 10 | 60 | |
|  | BMI-2300 | | | | | | | 40 |
|  | BMI-80 | | | | | | | |
|  | TAIC | | | | 10 | 40 | | |
|  | B-3000 | | | | | | | |
|  | Ricon184MA6 | | | | | | | |
|  | D-1118 | | | | | | | |
| phosphorus-containing silane compound | Synthesized Compound 1 | 50 | 50 | 50 | 50 | 50 | 50 | 50 |
|  | Synthesized Compound 2 | | | | | | | |
|  | Synthesized Compound 3 | | | | | | | |

TABLE 2-continued

Resin compositions of Examples (in part by weight) and test results

| | | | | | | | | |
|---|---|---|---|---|---|---|---|---|
| other phosphorus-containing compound | phosphorus-containing siloxane 1 | | | | | | | |
| | phosphorus-containing siloxane 2 | | | | | | | |
| | phosphorus-containing siloxane 3 | | | | | | | |
| | phosphorus-containing siloxane A with vinyl group | | | | | | | |
| | phosphorus-containing siloxane B with vinyl group | | | | | | | |
| | phosphorus-containing silane 1 | | | | | | | |
| | phosphorus-containing silane 2 | | | | | | | |
| | phosphorus-containing silane coupling agent | | | | | | | |
| | phenyltrivinylsilane | | | | | | | |
| | DOPO | | | | | | | |
| inorganic filler | SC-2500 SMJ | 140 | 140 | 140 | 140 | 140 | 140 | 140 |
| curing accelerator | 25B | 1 | 1 | 1 | 1 | 1 | 1 | 1 |
| solvent (SC = 65%-70%) | MEK | PA | PA | PA | PA | PA | PA | PA |
| | toluene | PA | PA | PA | PA | PA | PA | PA |

| Property test | Unit | E8 | E9 | E10 | E11 | E12 | E13 | E14 |
|---|---|---|---|---|---|---|---|---|
| Z-axis ratio of thermal expansion | % | 2.20 | 2.30 | 2.32 | 2.20 | 2.60 | 2.10 | 2.30 |
| copper foil peeling strength | lb/in | 3.70 | 3.60 | 3.52 | 3.45 | 3.65 | 3.51 | 3.60 |
| inner resin flow | mm | 7.0 | 7.8 | 9.0 | 12.0 | 6.0 | 9.0 | 7.5 |
| branch-like pattern | none | none | none | none | none | none | none | none |
| dielectric constant | none | 3.56 | 3.56 | 3.56 | 3.58 | 3.50 | 3.60 | 3.58 |
| dissipation factor | none | 0.00510 | 0.00500 | 0.00490 | 0.00450 | 0.00470 | 0.00530 | 0.00520 |
| flame retardancy | none | V-0 | V-0 | V-0 | V-0 | V-0 | V-0 | V-0 |

TABLE 3

Resin compositions of Examples (in part by weight) and test results

| | component | E15 | E16 | E17 | E18 | E19 | E20 | E21 |
|---|---|---|---|---|---|---|---|---|
| resin additive | SA9000 | 100 | 100 | 100 | 100 | 100 | 100 | |
| | OPE-2st 2200 | | | | | | | |
| | BMI-70 | | 12 | 40 | 40 | 40 | 40 | |
| | BMI-2300 | | 20 | | | | | |
| | BMI-80 | 40 | 8 | | | | | |
| | TAIC | | | | | | | |
| | B-3000 | | | | | | | 100 |
| | Ricon184MA6 | | | | | | | 10 |
| | D-1118 | | | | | | | 30 |
| phosphorus-containing silane compound | Synthesized Compound 1 | 50 | 25 | 50 | 50 | 50 | 50 | 50 |
| | Synthesized Compound 2 | | 25 | | | | | |
| | Synthesized Compound 3 | | | | | | | |
| other phosphorus-containing compound | phosphorus-containing siloxane 1 | | | | | | | |
| | phosphorus-containing siloxane 2 | | | | | | | |
| | phosphorus-containing siloxane 3 | | | | | | | |
| | phosphorus-containing siloxane A with vinyl group | | | | | | | |
| | phosphorus-containing siloxane B with vinyl group | | | | | | | |
| | phosphorus-containing silane 1 | | | | | | | |
| | phosphorus-containing | | | | | | | |

TABLE 3-continued

Resin compositions of Examples (in part by weight) and test results

|  |  |  |  |  |  |  |  |  |
|---|---|---|---|---|---|---|---|---|
|  | silane 2 |  |  |  |  |  |  |  |
|  | phosphorus-containing silane coupling agent |  |  |  |  |  |  |  |
|  | phenyltrivinylsilane |  |  |  |  |  |  |  |
|  | DOPO |  |  |  |  |  |  |  |
| inorganic filler | SC-2500 SMJ | 140 | 140 | 70 | 225 | 140 | 140 | 140 |
| curing accelerator | 25B | 1 | 1.6 | 1 | 1 | 0.3 | 1.5 | 1.5 |
| solvent | MEK | PA | PA | PA | PA | PA | PA | PA |
| (SC = 65%-70%) | toluene | PA | PA | PA | PA | PA | PA | PA |
| Property test | Unit | E15 | E16 | E17 | E18 | E19 | E20 | E21 |
| Z-axis ratio of thermal expansion | % | 2.50 | 2.41 | 2.60 | 1.95 | 2.55 | 2.30 | 2.60 |
| copper foil peeling strength | lb/in | 3.70 | 3.48 | 3.60 | 3.40 | 3.48 | 3.55 | 3.30 |
| inner resin flow | mm | 8.2 | 8.1 | 11.0 | 5.5 | 10.0 | 5.2 | 11.0 |
| branch-like pattern | none | none | none | none | none | none | none | none |
| dielectric constant | none | 3.51 | 3.55 | 3.43 | 3.65 | 3.53 | 3.56 | 3.20 |
| dissipation factor | none | 0.00490 | 0.00500 | 0.00510 | 0.00490 | 0.00480 | 0.00510 | 0.00350 |
| flame retardancy | none | V-0 | V-0 | V-0 | V-0 | V-0 | V-0 | V-0 |

TABLE 4

Resin compositions of Comparative Examples (in part by weight) and test results

| | component | C1 | C2 | C3 | C4 | C5 | C6 |
|---|---|---|---|---|---|---|---|
| resin additive | SA9000 | 100 | 100 | 100 | 100 | 100 | 100 |
|  | OPE-2st 2200 |  |  |  |  |  |  |
|  | BMI-70 | 40 | 40 | 40 | 40 | 40 | 40 |
|  | BMI-2300 |  |  |  |  |  |  |
|  | BMI-80 |  |  |  |  |  |  |
|  | TAIC |  |  |  |  |  |  |
|  | B-3000 |  |  |  |  |  |  |
|  | Ricon184MA6 |  |  |  |  |  |  |
|  | D-1118 |  |  |  |  |  |  |
| phosphorus-containing silane compound | Synthesized Compound 1 |  |  |  |  |  |  |
|  | Synthesized Compound 2 |  |  |  |  |  |  |
|  | Synthesized Compound 3 |  |  |  |  |  |  |
| other phosphorus-containing compound | phosphorus-containing siloxane 1 | 50 |  |  |  |  |  |
|  | phosphorus-containing siloxane 2 |  | 50 |  |  |  |  |
|  | phosphorus-containing siloxane 3 |  |  | 50 |  |  |  |
|  | phosphorus-containing siloxane A with vinyl group |  |  |  | 50 |  |  |
|  | phosphorus-containing siloxane B with vinyl group |  |  |  |  | 50 |  |
|  | phosphorus-containing silane 1 |  |  |  |  |  | 50 |
|  | phosphorus-containing silane 2 |  |  |  |  |  |  |
|  | phosphorus-containing silane coupling agent |  |  |  |  |  |  |
|  | phenyltrivinylsilane |  |  |  |  |  |  |
|  | DOPO |  |  |  |  |  |  |
| inorganic filler | SC-2500 SMJ | 140 | 140 | 140 | 140 | 140 | 140 |
| curing accelerator | 25B | 1 | 1 | 1 | 1 | 1 | 1 |
| solvent | MEK | PA | PA | PA | PA | PA | PA |
| (SC = 65%-70%) | toluene | PA | PA | PA | PA | PA | PA |
| Property test | Unit | C1 | C2 | C3 | C4 | C5 | C6 |
| Z-axis ratio of thermal expansion | % | 2.90 | 3.00 | 3.70 | 3.00 | 2.80 | 2.30 |
| copper foil peeling strength | lb/in | 2.80 | 2.60 | 1.90 | 2.50 | 2.60 | 3.50 |

TABLE 4-continued

Resin compositions of Comparative Examples (in part by weight) and test results

| | | | | | | | |
|---|---|---|---|---|---|---|---|
| inner resin flow | mm | 0.8 | 0.5 | 0.3 | 2.0 | 1.8 | 0.5 |
| branch-like pattern | none | serious | serious | serious | serious | serious | serious |
| dielectric constant | none | 3.70 | 3.75 | 3.85 | 3.70 | 3.75 | 3.55 |
| dissipation factor | none | 0.00580 | 0.00620 | 0.00700 | 0.00610 | 0.00620 | 0.00500 |
| flame retardancy | none | V-0 | V-0 | V-1 | V-0 | V-0 | V-0 |

TABLE 5

Resin compositions of Comparative Examples (in part by weight) and test results

| | component | C7 | C8 | C9 | C10 | C11 | C12 |
|---|---|---|---|---|---|---|---|
| resin additive | SA9000 | 100 | 100 | 100 | 100 | 100 | |
| | OPE-2st 2200 | | | | | | |
| | BMI-70 | 40 | 40 | 40 | 40 | 40 | |
| | BMI-2300 | | | | | | |
| | BMI-80 | | | | | | |
| | TAIC | | | | | | |
| | B-3000 | | | | | | 100 |
| | Ricon184MA6 | | | | | | 10 |
| | D-1118 | | | | | | 30 |
| phosphorus-containing silane compound | Synthesized Compound 1 | | | | | | |
| | Synthesized Compound 2 | | | | | | |
| | Synthesized Compound 3 | | | | | | |
| other phosphorus-containing compound | phosphorus-containing siloxane 1 | | | | | | |
| | phosphorus-containing siloxane 2 | | | | | | |
| | phosphorus-containing siloxane 3 | | | | | | |
| | phosphorus-containing siloxane A with vinyl group | | | | | | 50 |
| | phosphorus-containing siloxane B with vinyl group | | | | | | |
| | phosphorus-containing silane 1 | | | | | | |
| | phosphorus-containing silane 2 | 50 | | | | | |
| | phosphorus-containing silane coupling agent | | 50 | | | | |
| | phenyltrivinylsilane | | | 23 | 50 | | |
| | DOPO | | | 27 | | 50 | |
| inorganic filler | SC-2500 SMJ | 140 | 140 | 140 | 140 | 140 | 140 |
| curing accelerator | 25B | 1 | 1 | 1 | 1 | 1 | 1 |
| solvent (SC = 65%-70%) | MEK | PA | PA | PA | PA | PA | PA |
| | toluene | PA | PA | PA | PA | PA | PA |

| Property test | Unit | C7 | C8 | C9 | C10 | C11 | C12 |
|---|---|---|---|---|---|---|---|
| Z-axis ratio of thermal expansion | % | 2.30 | 3.80 | 2.30 | 2.35 | 3.40 | 3.60 |
| copper foil peeling strength | lb/in | 3.50 | 3.30 | 3.60 | 2.60 | 3.40 | 2.90 |
| inner resin flow | mm | 0.5 | 5.0 | 1.0 | 2.0 | 8.0 | 3.0 |
| branch-like pattern | none | serious | serious | mild | serious | serious | serious |
| dielectric constant | none | 3.55 | 3.70 | 3.60 | 3.40 | 3.80 | 3.35 |
| dissipation factor | none | 0.00500 | 0.00650 | 0.00520 | 0.00450 | 0.01000 | 0.00450 |
| flame retardancy | none | V-0 | V-2 | V-1 | V-2 | V-0 | V-1 |

Resin compositions from Table 1 to Table 5 were used to make varnishes and various samples (specimens) as described below and tested under conditions specified below so as to obtain the test results.

Varnish

Components of the resin composition from each Example (abbreviated as E, such as E1 to E21) or Comparative Example (abbreviated as C, such as C1 to C12) were added to a stirrer according to the amounts listed in Tables 1-5 for stirring and well-mixing to form a resin varnish.

For example, in Example E1, 100 parts by weight of a vinyl-containing polyphenylene ether resin (SA9000), 40 parts by weight of an aromatic maleimide resin (BMI-70) and 30 parts by weight of the Synthesized Compound 1 (having a structure of Formula (III)) were added to a stirrer containing a proper amount of toluene and a proper amount of methyl ethyl ketone (i.e., a proper amount (abbreviated as "PA") in Tables 1-5 represents an amount of solvent suitable for obtaining a desired solid content for the resin composition, such as a solid content of the varnish being 65 wt %), and the solution was mixed and stirred to fully dissolve the solid ingredients to form a homogeneous liquid state. Then 140 parts by weight of spherical silica (SC-2500 SMJ) were added and well dispersed, followed by adding 1 part by weight of a curing accelerator (25B, pre-dissolved by a proper amount of solvent) and stirring for 1 hour to obtain the varnish of resin composition E1.

In addition, according to the components and amounts listed in Table 1 to Table 5 above, varnishes of Examples E2 to E21 and Comparative Examples C1 to C12 were prepared following the preparation process of the varnish of Example E1.

Prepreg (Using 2116 E-Glass Fiber Fabric)

Resin compositions from different Examples (E1 to E21) and Comparative Examples (C1 to C12) listed in Table 1 to Table 5 were respectively added to a stirred tank, well mixed and fully dissolved as varnishes and then loaded to an impregnation tank. A fiberglass fabric (e.g., 2116 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 52%).

Prepreg (Using 1080 E-Glass Fiber Fabric)

Resin compositions from different Examples (E1 to E21) and Comparative Examples (C1 to C12) listed in Table 1 to Table 5 were respectively added to a stirred tank, well mixed and fully dissolved as varnishes and then loaded to an impregnation tank. A fiberglass fabric (e.g., 1080 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 71%).

Copper-Clad Laminate (Obtained by Laminating Five Prepregs)

Two 18 μm hyper very low profile 2 copper foils (HVLP2 copper foils) and five prepregs made from each resin composition (using 1080 E-glass fiber fabric) were prepared batchwise. Each prepreg has a resin content of about 71%. A copper foil, five prepregs and a copper foil were superimposed in such order and then subjected to a vacuum condition for lamination at 220° C. for 2 hours to form each copper-clad laminate sample. Insulation layers were formed by curing (C-stage) five sheets of superimposed prepreg between the two copper foils, and the resin content of the insulation layers was about 71%.

Copper-Clad Laminate (Obtained by Laminating Eight Prepregs)

Two 18 μm hyper very low profile 2 copper foils (HVLP2 copper foils) and eight prepregs made from each resin composition (using 2116 E-glass fiber fabric) were prepared batchwise. Each prepreg has a resin content of about 52%. A copper foil, eight prepregs and a copper foil were superimposed in such order and then subjected to a vacuum condition for lamination at 220° C. for 2 hours to form each copper-clad laminate sample. Insulation layers were formed by curing (C-stage) eight sheets of superimposed prepreg between the two copper foils, and the resin content of the insulation layers was about 52%.

Copper-Free Laminate (Obtained by Laminating Eight Prepregs)

Each copper-clad laminate obtained by laminating eight prepregs was etched to remove the two copper foils to obtain a copper-free laminate made from laminating eight prepregs and having a resin content of about 52%.

Copper-Free Laminate (Obtained by Laminating Two Prepregs)

Two 18 μm hyper very low profile 2 copper foils (HVLP2 copper foils) and two prepregs made from each resin composition (using 1080 E-glass fiber fabric) were prepared batchwise. Each prepreg has a resin content of about 71%. A copper foil, two prepregs and a copper foil were superimposed in such order and then subjected to a vacuum condition for lamination at 220° C. for 2 hours to form each copper-clad laminate, which was then subjected to an etching process to remove the copper foils on both sides to obtain a copper-free laminate sample. Insulation layers were formed by curing (C-stage) two sheets of superimposed prepreg between the two copper foils, and the resin content of the insulation layers was about 71%.

Test items and test methods are described below.

1. Ratio of Thermal Expansion

A copper-free laminate sample obtained by laminating eight prepregs was subjected to thermal mechanical analysis (TMA) during the measurement of the ratio of thermal expansion (i.e., ratio of dimensional change). Each sample was heated from 35° C. to 265° C. at a heating rate of 10° C./minute and then subjected to the measurement of dimensional change (%) between 50° C. and 260° C. in Z-axis by reference to the method described in IPC-TM-650 2.4.24.5, wherein lower dimensional change percentage is more preferred.

In general, high ratio of thermal expansion in Z-axis of a laminate indicates high ratio of dimensional change. For a copper-clad laminate, high ratio of dimensional change may result in reliability problems such as delamination during printed circuit board fabrication. In the present technical field, lower ratio of thermal expansion is more preferred, and a difference in ratio of thermal expansion of greater than or equal to 0.1% represents a significant difference.

For example, articles made from the resin composition disclosed herein are characterized by a Z-axis ratio of thermal expansion as measured by reference to IPC-TM-650 2.4.24.5 of less than or equal to 2.60%, such as less than or equal to 1.95%, 2.10%, 2.20%, 2.30%, 2.32%, 2.41%, 2.43%, 2.45%, 2.50%, 2.51%, 2.55% or 2.60%, such as between 1.95% and 2.60%.

2. Copper Foil Peeling Strength (Peel Strength, P/S)

A copper-clad laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (1b/in) required to pull off the copper foil from the laminate surface. A higher copper foil peeling strength is more preferred, and a difference in copper foil peeling strength of greater than or equal to 0.1 lb/in represents a significant difference.

For example, articles made from the resin composition disclosed herein are characterized by a copper foil peeling strength as measured by reference to IPC-TM-650 2.4.8 of greater than or equal to 3.30 lb/in, preferably greater than or equal to 3.30 lb/in, 3.32 lb/in, 3.40 lb/in, 3.45 lb/in, 3.48 lb/in, 3.50 lb/in, 3.51 lb/in, 3.52 lb/in, 3.55 lb/in, 3.60 lb/in, 3.65 lb/in or 3.70 lb/in, such as between 3.30 lb/in and 3.70 lb/in.

3. Inner Resin Flow

First, an EM-827 copper-containing laminate was used as a copper-containing core (available from Elite Electronic Material (Zhongshan) Co., Ltd., using 7628 E-glass fiber fabric and 1-ounce HTE copper foil), which had a thickness of 28 mil. Then the surface copper foil of the copper-containing core was subjected to a conventional brown oxidation process to obtain a brown oxide treated core.

A prepreg (using 1080 E-glass fiber fabric, resin content of about 71%, about 4.5 mil in thickness, 17 inch*15 inch in size) prepared from each Example (E1 to E21) and each Comparative Example (C1 to C12) and a brown oxide treated core (28 mil in thickness, 18 inch*16 inch in size) were prepared, wherein the center of the prepreg was a 4 inch*4 inch rhombus opening formed by using a conventional punching machine.

A piece of 0.5-ounce HTE copper foil (in reverse position, i.e., in contact with the prepreg with its smooth surface), a prepreg and a brown oxide treated core were superimposed in such order, followed by lamination and curing for 2 hours in vacuum at high temperature (200° C.) and high pressure (360 psi) to obtain a copper-containing multi-layer board. The surface copper foil of the copper-containing multi-layer board was removed to obtain a sample for inner resin flow test. Each side of the 4 inch*4 inch rhombus shape of the sample for inner resin flow test was divided into four equal sections by three points, and the resin flow (i.e., vertical distance of resin flow) of each of the twelve points was measured to calculate the average of resin flow at the twelve points, so as to obtain the inner resin flow (as an average, in mm) of the sample. Generally, the inner resin flow is preferably between 5 mm and 12 mm.

4. Branch-Like Pattern

Figure 2:
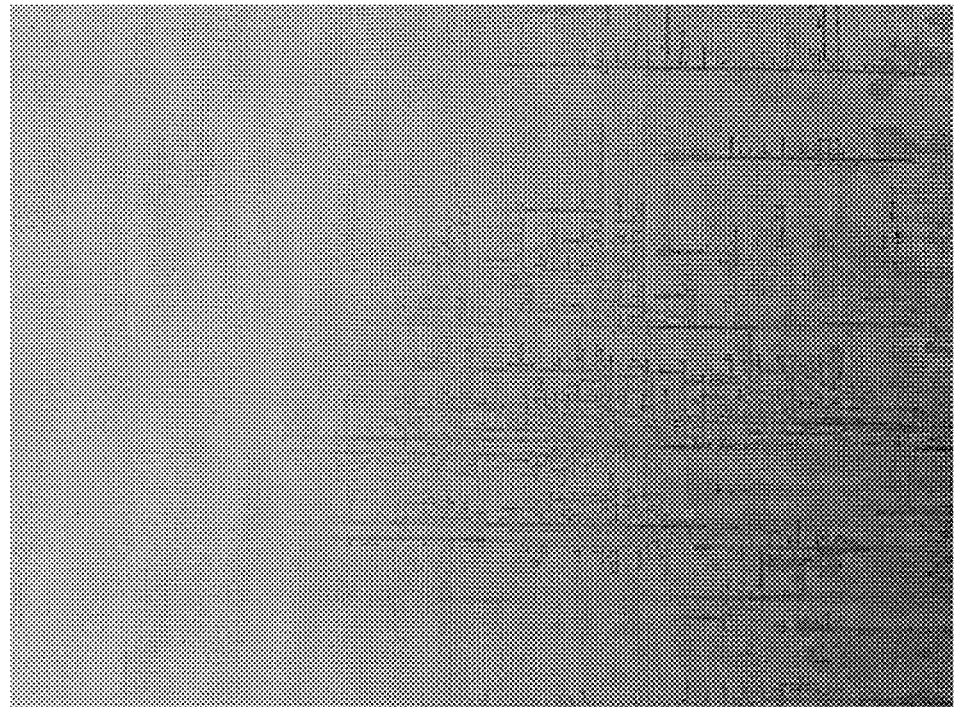
FIG. 2 illustrates a copper-free laminate having branch-like pattern.
Figure 3:
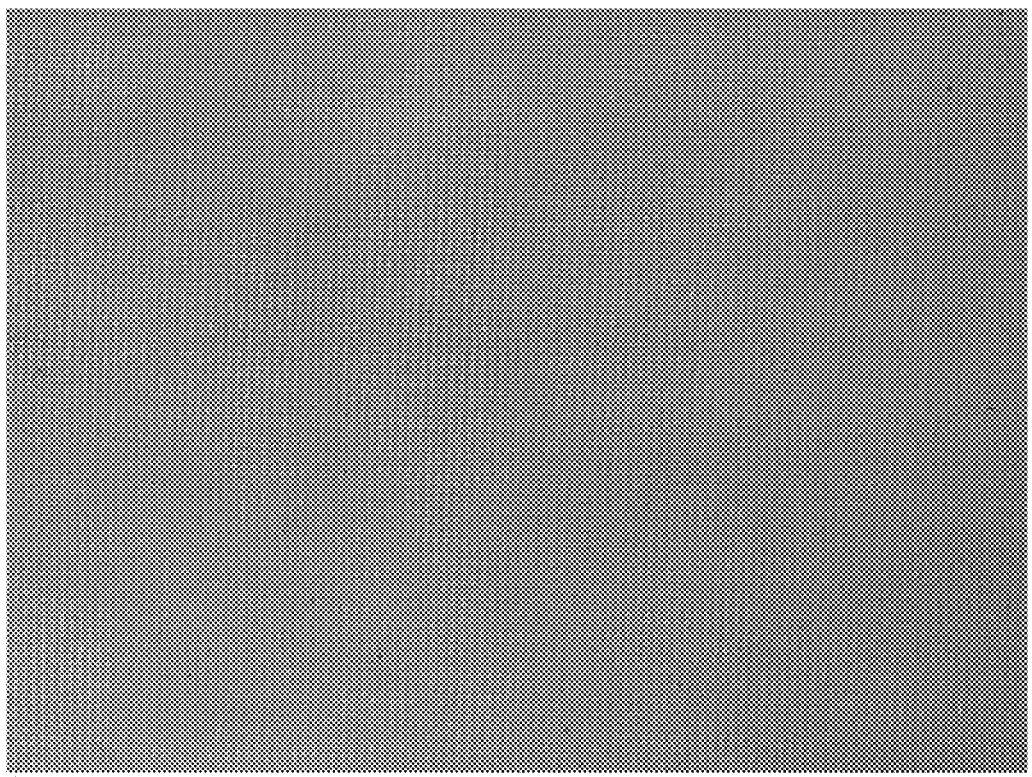
FIG. 3 illustrates a copper-free laminate not having branch-like pattern.

The copper foils on both sides of a copper-clad laminate (obtained by laminating five prepregs) were remove to obtain a copper-free laminate. The surface of the insulation layer of the copper-free laminate was examined with naked eyes to determine whether branch-like pattern was formed at the edge, which represents poor compatibility of the resin composition or high flowability variation that causes inhomogeneity. Presence of branch-like pattern in the laminate will cause several drawbacks including inconsistent properties (poor reliability) of printed circuit boards made therefrom and significantly lowered yield, such as poor dielectric properties, poor thermal resistance, inconsistent thermal expansion or poor interlayer adhesion. FIG. 2 illustrates a copper-free laminate having branch-like pattern, and FIG. 3 illustrates a copper-free laminate not having branch-like pattern.

5. Dielectric Constant (Dk) and Dissipation Factor (Df)

In the measurement of dielectric constant and dissipation factor, a copper-free laminate sample (obtained by laminating two prepregs) was tested by using a microwave dielectrometer available from AET Corp. by reference to JIS C2565 at 10 GHz for analyzing each sample. Lower dielectric constant or lower dissipation factor represents better dielectric properties of the sample.

Under a 10 GHz frequency, for a Dk value of less than or equal to 3.60 and a Df value of less than or equal to 0.005, a difference in Dk value of greater than or equal to 0.05 represents substantial difference (i.e., significant technical difficulty) in dielectric constant of different laminates, and a difference in Dk value of less than 0.05 represents no substantial difference in dielectric constant of different laminates; a difference in Df value of less than 0.0001 represents no substantial difference in dissipation factor of different laminates, and a difference in Df value of greater than or equal to 0.0001 represents a substantial difference (i.e., significant technical difficulty) in dissipation factor of different laminates. For a Df value of greater than 0.005, a difference in Df value of less than 0.0003 represents no substantial difference in dissipation factor of different laminates, and a difference in Df value of greater than or equal to 0.0003 represents a substantial difference (i.e., significant technical difficulty) in dissipation factor of different laminates.

For example, articles made from the resin composition disclosed herein, as measured by reference to JIS C2565 at 10 GHz, have a dielectric constant of less than or equal to 3.65, such as between 3.20 and 3.65, and a dissipation factor of less than or equal to 0.0053, such as between 0.0035 and 0.0053.

6. Flame Retardancy

A copper-free laminate sample (obtained by laminating eight prepregs) was used in the flame retardancy test. The flame retardancy test was performed in accordance with the UL 94 rating, and the results were represented by V-0, V-1, or V-2, wherein V-0 indicates a superior flame retardancy to V-1, and V-1 indicates a superior flame retardancy to V-2.

For example, articles made from the resin composition disclosed herein have a flame retardancy of V-0 as measured by reference to UL 94 rating. In addition, according to the test results disclosed above, it can be confirmed that the phosphorus-containing silane compound of the present disclosure, as a flame retardant, may achieve V-0 flame retardancy.

The structure and property of the phosphorus-containing silane compound disclosed herein are different from known flame retardant compounds. For example, by comparing the phosphorus-containing silane compound of Formula (III) with the phosphorus-containing siloxane A with vinyl group of Formula (X), the phosphorus-containing siloxane B with vinyl group of Formula (XI) and the phosphorus-containing silane coupling agent of Formula (XIV), it can be found that the phosphorus-containing silane compound of Formula (III) according to the present disclosure has only one silicon atom which is bonded with vinyl groups and a phenyl group and does not have a siloxane bond in the structure.

Side-by-side comparison of Example E3 and Comparative Examples C4, C5 and C8 shows that, by using the phosphorus-containing silane compound according to the present disclosure, in contrast to the phosphorus-containing siloxane A with vinyl group of Formula (X), the phosphorus-containing siloxane B with vinyl group of Formula (XI) and the phosphorus-containing silane coupling agent of Formula (XIV), articles made therefrom achieve significant improvements in Z-axis ratio of thermal expansion, branch-like pattern, dielectric constant and dissipation factor.

In addition, by comparing the phosphorus-containing silane compound according to the present disclosure, which has reactivity, with the non-reactive phosphorus-containing silane 1 of Formula (XII) or the phosphorus-containing silane 2 of Formula (XIII), it can be observed that the phosphorus-containing silane compound according to the present disclosure has one or two vinyl groups bonded to the silicon atom.

Side-by-side comparison of Examples E3-E5 and Comparative Examples C6 and C7 shows that the phosphorus-containing silane compound according to the present disclosure, in contrast to the non-reactive phosphorus-containing silane 1 of Formula (XII) or the phosphorus-containing silane 2 of Formula (XIII), has better solubility (wherein phosphorus-containing silane 1 and phosphorus-containing silane 2 have poor solubility), and articles made therefrom have improved inner resin flow and branch-like pattern.

In addition, by comparing the phosphorus-containing silane compound according to the present disclosure, which has reactivity, with the non-reactive phosphorus-containing siloxane compound of Formula (IX), it can be observed that the phosphorus-containing silane compound according to the present disclosure has one or two vinyl groups bonded to the sole silicon atom and does not have a siloxane bond in the structure.

Side-by-side comparison of Examples E3-E5 and Comparative Examples C1-C3 shows that, by using the phosphorus-containing silane compound according to the present disclosure, in contrast to the non-reactive phosphorus-containing siloxane compound of Formula (IX), articles made therefrom achieve significant improvements in Z-axis ratio of thermal expansion, copper foil peeling strength, inner resin flow, branch-like pattern, dielectric constant and dissipation factor.

Moreover, side-by-side comparison of the phosphorus-containing silane compound of the present disclosure with the raw material phenyltrivinylsilane or 9,10-dihydro-9-oxa-10-phosphaphenanthrene-10-oxide (DOPO), such as Comparative Examples C9-C11, shows that articles made from the phosphorus-containing silane compound of the present disclosure may achieve improvements in one, more or all properties including Z-axis ratio of thermal expansion, copper foil peeling strength, inner resin flow, branch-like pattern, dielectric constant, dissipation factor and flame retardancy.

By the comparison of all Examples E1-E21 with all Comparative Examples C1-C12, it is confirmed that laminates made by using the phosphorus-containing silane compound disclosed herein may achieve at the same time one, more or all properties including a Z-axis ratio of thermal expansion of less than or equal to 2.60%, an inner resin flow of greater than or equal to 5.0 mm and absence of branch-like pattern. In contrast, Comparative Examples C1-C12 not using the technical solution of the present disclosure fail to achieve the aforesaid technical effects.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as more preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A phosphorus-containing silane compound having a structure of $SiR_1(R_2)_n(R_3)_{3-n}$:

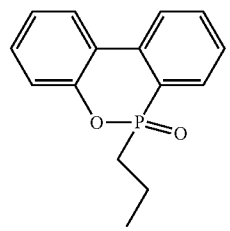

Formula (I)

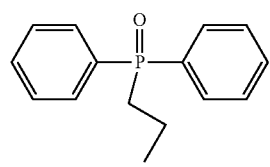

Formula (II)

wherein $R_1$ is a phenyl group, $R_2$ is a vinyl group, $R_3$ each independently is a structure of Formula (I) or Formula (II), and n is 1 or 2.

2. The phosphorus-containing silane compound of claim 1, which has a structure represented by any one of the following Formula (III) to Formula (VI):

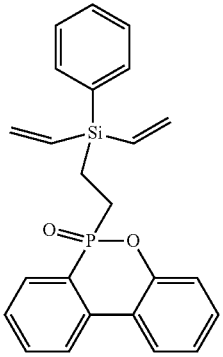

Formula (III)

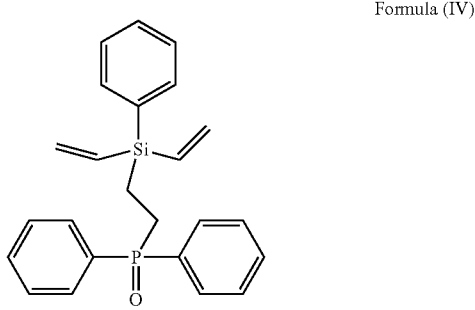

Formula (IV)

Formula (V)

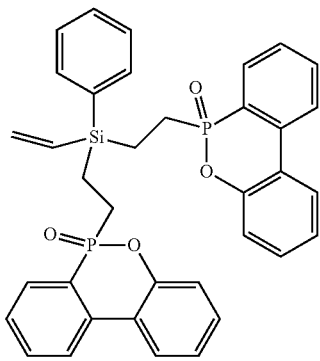

Formula (VI)

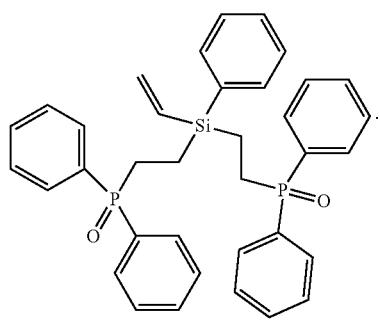

3. A method of making the phosphorus-containing silane compound of claim 1, comprising a step of reacting phenyltrivinylsilane with 9,10-dihydro-9-oxa-10-phosphaphenanthrene-10-oxide or diphenylphosphine oxide at a temperature of 160° C. to 200° C.

4. The method of claim 3, characterized by not using solvent and initiator.

5. The method of claim 3, wherein a molar ratio of a reactive functional group of phenyltrivinylsilane to a reactive functional group of 9,10-dihydro-9-oxa-10-phosphaphenanthrene-10-oxide or a reactive functional group of diphenylphosphine oxide is between 3:1 and 3:2.

6. A resin composition comprising the phosphorus-containing silane compound of claim 1 and a resin additive.

7. The resin composition of claim 6, wherein the resin additive comprises a vinyl-containing resin, a styrene maleic anhydride resin, an epoxy resin, a phenolic resin, a benzoxazine resin, a cyanate ester resin, a polyester resin, a polyamide resin, a polyimide resin or a combination thereof.

8. The resin composition of claim 7, wherein the vinyl-containing resin comprises a vinyl-containing polyphenylene ether resin, a maleimide resin, a maleimide triazine resin, a polyolefin resin, styrene, divinylbenzene, bis(vinylbenzyl) ether, 1,2,4-trivinyl cyclohexane, bis(vinylphenyl) ethane, bis(vinylphenyl)hexane, bis(vinylphenyl) dimethyl ether, bis(vinylphenyl) dimethyl benzene, triallyl isocyanurate, triallyl cyanurate, a prepolymer of any one of the foregoing components or a combination thereof.

9. The resin composition of claim 8, wherein the vinyl-containing polyphenylene ether resin comprises a vinylbenzyl-terminated polyphenylene ether resin, a methacrylate-terminated polyphenylene ether resin or a combination thereof.

10. The resin composition of claim 9, wherein the vinylbenzyl-terminated polyphenylene ether resin and the methacrylate-terminated polyphenylene ether resin respectively comprise a structure of Formula (VII) and a structure of Formula (VIII):

Formula (VII)

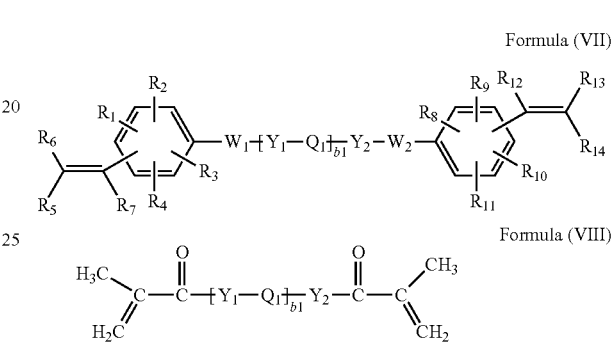

Formula (VIII)

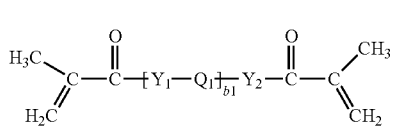

wherein $R_1$ to $R_{14}$ are individually H or —$CH_3$, and $W_1$ and $W_2$ are individually a $C_1$ to $C_3$ bivalent aliphatic group;

b1 is an integer of 0 to 8;

$Q_1$ comprises a structure of any one of Formula (B-1) to Formula (B-3) or a combination thereof:

Formula (B-1)

Formula (B-2)

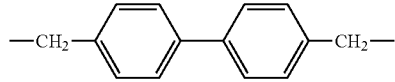

Formula (B-3)

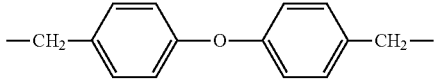

$Y_1$ and $Y_2$ independently comprise a structure of Formula (B-4):

Formula (B-4)

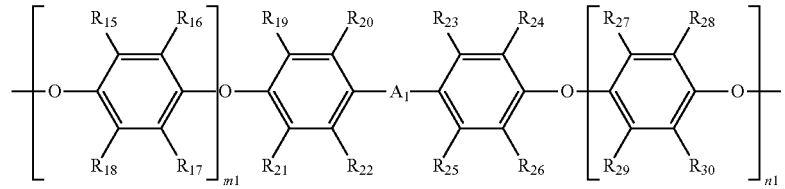

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

11. The resin composition of claim 8, wherein the maleimide resin comprises 4,4'-diphenylmethane bismaleimide, oligomer of phenylmethane maleimide, m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, maleimide resin containing aliphatic long-chain structure or a combination thereof.

12. The resin composition of claim 8, comprising 10 parts by weight to 60 parts by weight of the maleimide resin and 30 parts by weight to 70 parts by weight of the phosphorus-containing silane compound relative to 100 parts by weight of the vinyl-containing polyphenylene ether resin.

13. The resin composition of claim 6, further comprising amine curing agent, flame retardant, inorganic filler, curing accelerator, polymerization inhibitor, coloring agent, solvent, toughening agent, silane coupling agent or a combination thereof.

14. An article made from the resin composition of claim 6, comprising a prepreg, a resin film, a laminate or a printed circuit board.

15. The article of claim 14, which has a surface absent of branch-like pattern under visual inspection.

16. The article of claim 14, having an inner resin flow after lamination of greater than or equal to 5.0 mm.

17. The article of claim 14, having a Z-axis ratio of thermal expansion as measured by reference to IPC-TM-650 2.4.24.5 of less than or equal to 2.60%.

* * * * *